A. ROTTMANN.
PROCESS FOR THE RECOVERY OF BY-PRODUCTS FROM GASES OF FUELS.
APPLICATION FILED JULY 5, 1912.
1,061,949.
Patented May 13, 1913.
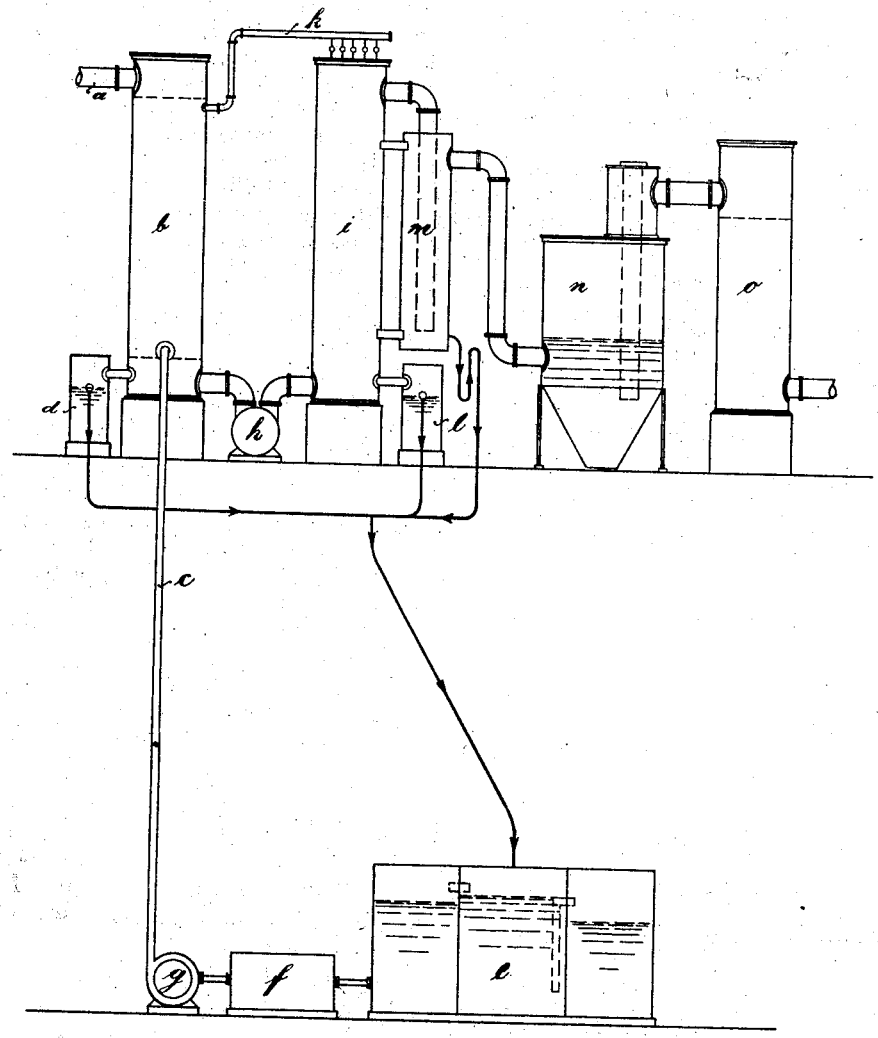

UNITED STATES PATENT OFFICE.

AUGUST ROTTMANN, OF BOCHUM, GERMANY, ASSIGNOR TO THE FIRM OF DR. C. OTTO & COMP. GES. MIT BESCHRÄNKTER HAFTUNG, OF BOCHUM, GERMANY.

PROCESS FOR THE RECOVERY OF BY-PRODUCTS FROM GASES OF FUELS.

1,061,949.   Specification of Letters Patent.   Patented May 13, 1913.

Application filed July 5, 1912. Serial No. 707,764.

*To all whom it may concern:*

Be it known that I, AUGUST ROTTMANN, engineer, a citizen of the German Empire, residing 32 Wielandstrasse, Bochum, Westphalia, Germany, have invented certain new and useful Improvements in the Process for the Recovery of By-Products from Gases of Fuels, of which the following is a specification.

The object of my invention is to recover tar and ammonia from distillation gases in a novel and more economical way than before and consists in reloading the gases with the greater part of the water, which is condensed with the separation of the tar; the reheating of the condensed water is effected by means of the heat of the raw gases and results in a great economy. Furthermore by the process the circulating liquor is enriched in fixed ammonia-salts and its amount is comparatively very small and highly concentrated and its distillation with lime therefore requires very little steam. The fixed salts also may be recovered directly from the circulating liquor by evaporation of the strongly concentrated liquor.

Suitable apparatus for carrying out this process is shown on the drawing, which forms part of the specification.

The hot distillation gases enter the cooler *b* through a pipe *a*, the cooling liquid being provided through pipe *c*; the condensate from the gas leaves the cooler by means of the sealed tar pot *d*. The cooling liquid is part of the condensate, recovered in a later period of the process; it is separated from the tar in the tar separator *e* and the liquor is brought to the required temperature in cooler *f* and forced to the cooler *b* by means of the pump *g* and pressure pipe *c*. From the cooler *b* the gas is sucked by the exhauster *h* and forced into the washer or regenerator *i*; the hot water coming from cooler *b* through pipe *k* is injected downward in the washer *i* against the ascending gas. In the washer the cool gas is reheated and it takes up upon its way all the volatile ammonia and evaporates a great part of the falling water; the surplus of the washing liquid flows off through tar pot *l* to the separator *e* and is used over and over again. Following the washer, the gas flows through a tank *m*, in which water sprays are provided and it then goes in a saturater *n* through a bath of acid and all volatile ammonia is absorbed. Behind the saturater *n* the gas passes into a cooler *o*, in which more or less of the water vapor in the gas is condensed according to the temperature of the outflowing gas. By loading the gas in the washer *i* with the greater part of the water, condensed in the preceding cooler and condensing the water vapor behind the saturater, there is left for distillation only a small amount of concentrated liquor and therefore the amount of obnoxious waste liquor is also very small. The condensate from the cooler *o* is a clean water and may be used for different purposes—for quenching coke or as a cooling water itself; this water may also be evaporated on a cooling tower and these vapors will have no bad effect on the surrounding vegetation.

I claim:

Process for the recovery of by-products from distillation gases of fuels, which consists in cooling the raw distillation gases for the condensation of tar, part of the ammonia, and steam, with a condensate from a later period of the process, which condensate is cooled and separated from its tar, then bringing the heated cooling liquid into intimate contact with the cooled gases thereby loading the gases with all the volatile ammonia and with the greater part of the condensed water, and then passing the gases into a bath of acid.

In testimony whereof I have signed this specification in the presence of two subscribing witnesses.

AUGUST ROTTMANN. [L. S.]

Witnesses:
ALBERT NUFER,
CHAS. J. WRIGHT.